US008478209B2

(12) United States Patent
Bai et al.

(10) Patent No.: US 8,478,209 B2
(45) Date of Patent: Jul. 2, 2013

(54) METHOD AND APPARATUS FOR MULTIMEDIA CONTENT PROMOTION IN VEHICULAR WIRELESS NETWORKS

(75) Inventors: Fan Bai, Ann Arbor, MI (US); Donald K. Grimm, Utica, MI (US); Timothy J. Talty, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 13/101,256

(22) Filed: May 5, 2011

(65) Prior Publication Data

US 2012/0282895 A1 Nov. 8, 2012

(51) Int. Cl.
*H04B 1/034* (2006.01)
*H04B 7/00* (2006.01)

(52) U.S. Cl.
USPC ............................ 455/99; 455/41.2; 455/507

(58) Field of Classification Search
USPC .......................................... 455/99, 41.2, 507
See application file for complete search history.

(56) References Cited

U.S. PATENT DOCUMENTS 7,983,206 B2 * 7/2011 Tian ............................ 370/312
2004/0198281 A1 * 10/2004 Lane ......................... 455/186.1
2006/0045115 A1 * 3/2006 Nix et al. ..................... 370/432

* cited by examiner

*Primary Examiner* — Steven Lim

(57) ABSTRACT

A multimedia content dissemination system is provided for mobile vehicles. A wireless vehicle communication network provides communication among mobile vehicles in the network. At least one host vehicle within the wireless vehicle communication network is selected by an authorized entity for disseminating multimedia content received by the authorized entity. The at least one host vehicle transmits an inquiry to target vehicles in the wireless vehicle communication network. The inquiry comprises a content profile that includes descriptors associated with the multimedia content for allowing target vehicles to determine whether an interest exists in the multimedia content. The at least one host vehicle transmits the multimedia content in encrypted form to an interested target vehicle for sampling the multimedia content. The interested target vehicle requests ongoing use of the multimedia content from the authorized entity in response to sampling the multimedia content. The authorized entity provides to the interested target vehicle a decryption key for authorizing ongoing use of the multimedia content.

20 Claims, 2 Drawing Sheets

METHOD AND APPARATUS FOR MULTIMEDIA CONTENT PROMOTION IN VEHICULAR WIRELESS NETWORKS

BACKGROUND OF INVENTION

An embodiment relates generally to telematics.

Telematics involve communication applications that send, receive, and store information via telecommunication devices between multiple remote entities. Information is shared with other remote entities so that the information can be used to further enhance a remote entity's awareness of its environment. Such uses may include, but is not limited to, safety communications, emergency warnings, and vehicle tracking.

Downloading multimedia content, such as music and video, either wirelessly or by the internet has become increasingly popular in comparison to purchasing such media at a retail store. Telematics could potentially be used to distribute multimedia content; however, sharing multimedia content with other remote objects could easily overburden the bandwidth of the communication medium if not properly controlled. Moreover, the copyright protection must also be preserved so that files are not transferred and used illegally.

SUMMARY OF INVENTION

An advantage of an embodiment of the invention is the dissemination of multimedia content to targeted vehicles utilizing selected seed vehicles. Seed vehicles are selected based on either their interest in the multimedia content or their mobility capabilities which enable the dissemination of the multimedia content to reach out to larger populations of the vehicular network. A determination is made based on remote vehicle's profile interest as to whether the remote vehicle may have an interest in the multimedia content. Profiling content (e.g., an electronic program guide or catalog) of the multimedia content is provided to interested vehicles so that the remote vehicle can evaluate and ascertain the interest in the multimedia content. If a remote vehicle is interested, the seed vehicle transmits the multimedia content to the remote vehicle for storage, sample playback, or redistribution to other vehicles. After the remote vehicle samples the multimedia content, the remote vehicle may then purchase the multimedia content. If the remote vehicle decides to use the multimedia content a digital rights management verification is performed that may require the remote vehicle to purchase playback rights. Tracking is performed to maintain a list of the vehicles that receive the multimedia content. Digital restriction management may be used to ensure that the multimedia content is limited to its temporary access and use.

An embodiment contemplates a method for cooperatively disseminating multimedia content wirelessly among mobile vehicles in a wireless vehicle communication network. The communication between mobile vehicles within the wireless vehicle communication network utilizes dedicated short-range communications and/or other wireless local area network (WLAN) technologies. At least one host vehicle is selected within the wireless vehicle communication network disseminates the multimedia content. However, it is possible that all vehicles in the communication network can disseminate content. The multimedia content is provided to at least one host vehicle by an entity authorized to distribute the multimedia content. The at least one host vehicle selectively transmits inquiries to target vehicles in the wireless vehicle communication network. The inquiries comprises a content profile that includes descriptors (e.g., tags) associated with the multimedia content for allowing target vehicles in the communication network to determine whether an interest exists in the multimedia content. An interested target vehicle transmits a response to the at least one host vehicle requesting a sampling of the multimedia content. Then at least one host vehicle transmits the multimedia content in encrypted form to the interested vehicle for sampling the multimedia content. The interested vehicle requests ongoing use of the multimedia content from the authorized entity in response to sampling the multimedia content. The authorized entity provides to the interested target vehicle a decryption key for authorizing ongoing use of the multimedia content. The interested vehicle can also become the host vehicle and hence redistribute the content to other interested vehicles in the communication network.

An embodiment contemplates a multimedia content dissemination system for mobile vehicles. A wireless vehicle communication network provides communication among the mobile vehicles of the network. The wireless vehicle communication network utilizes dedicated short term communications between the mobile vehicles. An authorized entity initiates distribution of multimedia content. At least one host vehicle within the wireless vehicle communication network is selected by the authorized entity for disseminating multimedia content received by the authorized entity. The at least one host vehicle transmits an inquiry to target vehicles in the wireless vehicle communication network. The inquiry comprises a content profile that includes descriptors associated with the multimedia content for allowing target vehicles to determine whether an interest exists in the multimedia content. The at least one host vehicle transmits the multimedia content in encrypted form to an interested target vehicle for sampling the multimedia content. The interested target vehicle requests ongoing use of the multimedia content from the authorized entity in response to sampling the multimedia content. The authorized entity provides to the interested target vehicle a decryption key for authorizing ongoing use of the multimedia content.

DETAILED DESCRIPTION

Figure 1:
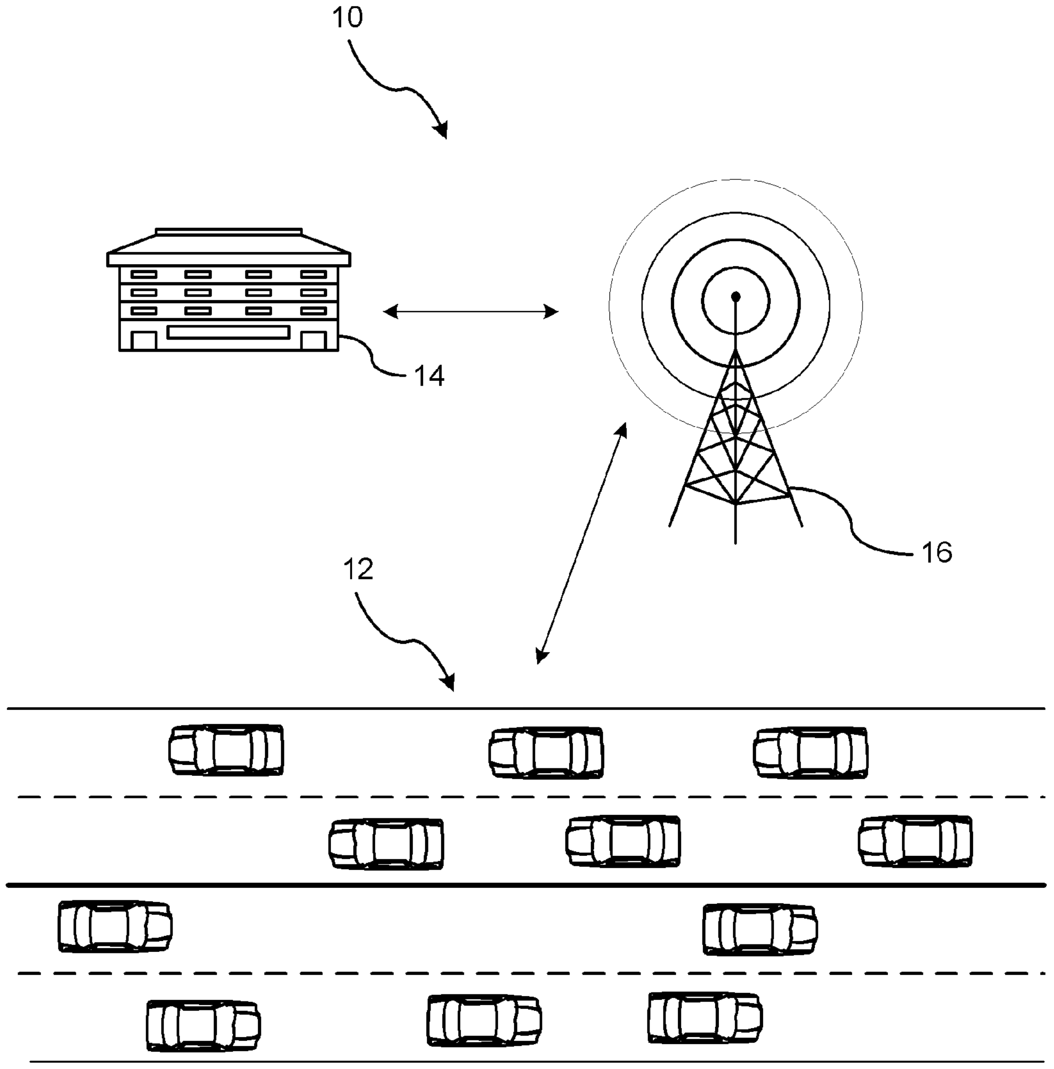
FIG. 1 is a block diagram of the vehicle communication system according to an embodiment of the invention.

There is shown in FIG. 1 a wireless vehicle communication network 10. The vehicle communication network 10 includes a plurality of vehicles 12 that are in communication with one another. The plurality of vehicles 12 may communicate among one another using V2V communications, such as dedicated short-term communications (DSRC) or WiFi communications. In addition, the plurality of vehicles 12 communicates with a fixed infrastructure 14 using V2X communications (e.g., DSRC) or cellular communications. Cellular communications may be used if the distance between a respective vehicle and the fixed infrastructure 14 may be outside of the communication range of the DSRC or similar. A vehicle may use a DSRC radio if V2X communications are utilized or a cellular radio if cellular communications are utilized. While V2X communication messages can be transmitted directly between the plurality of vehicles 12 or directly between a vehicle and a fixed infrastructure 14 over short distances, cellular communications can communicate messages over greater distances utilizing cell towers 16. DSRC is meant to complement cellular communications by providing very high data transfer rates in relative small communication zones where minimizing latency in the communications are important. It should be understood that the DSRC is used to wirelessly transmit messages and data directly between vehicles, whereas the cellular communications are used to wirelessly transmit messages and data between the fixed infrastructure and a respective vehicle.

Wireless messages transmitted between vehicles may be transmitted as a standard periodic beacon message. The wireless beacon message includes data about environmental awareness conditions relating to vehicle positions, vehicle kinematics/dynamic parameters, traffic, or events taking place along the road that so as to provide advance warning to neighboring vehicles. In addition, a beacon message may also contain non-safety related information. Such non-safety related information may include a consumption content profile that identifies a vehicle user's multimedia content interests based on prior multimedia content usage.

The V2X and/or cellular communications may also be used as a medium for disseminating newly released multimedia content that an authoritative entity, such as the fixed infrastructure 14, desires to distribute. The authoritative entity 14 has existing rights in a multimedia content for promoting and granting usage rights to users of the vehicle communication network. The authoritative entity 14 leverages mobility data and multimedia content interest data of a vehicle to identify an optimal seed strategy. The seed strategy identifies "best fit" vehicles to disseminate multimedia content that the authoritative entity seeks to promote.

The authoritative entity identifies seed vehicles, hereinafter referred to as host vehicles, that can promote and disseminate the multimedia content to vehicles that may have a potential interest in the multimedia content, hereinafter referred to as target vehicles. The authoritative entity selects the host vehicle based on either mobility-target seeding or interest-target seeding.

In mobility-target seeding, vehicles are selected as a host vehicle based on their ability to reach out to a large population in the vehicular communication network. Vehicles that are best suited to be a host vehicle include, but are not limited to, taxis, buses, and fleet vehicles. To determine whether a vehicle is suitable for being a host vehicle based on mobility, information relating to encounters with other vehicles within the vehicle communication network is collected and analyzed for a potential seed vehicle. Storage and communication capability may also be factored in determining host vehicle selection. Each vehicle within the vehicular communication network maintains a mobility encounter profile that includes a record of communication exchanges with other vehicles. The vehicles having the most active encounters with other vehicles are identified and selected. The multimedia content is provided to the selected host vehicles from the authoritative entity for dissemination to target vehicles within the vehicle communication network.

In interest-target seeding, vehicles are selected as a host vehicle based on their interest level in the multimedia content. Vehicles that are best suited as a host vehicle include those vehicles that would share the same specific interests in the multimedia content as other vehicles within the interested group. To determine whether a vehicle is suitable for being a host vehicle based on multimedia content interests, information collected from encounters with other vehicles within the network is analyzed. Vehicles within the vehicular communication network maintain a consumption content profile that includes a record that identifies its multimedia content interest based on prior multimedia content usage. The consumption content profile is collected from all potential host vehicles within the vehicle communication network. The vehicles having a closest match to the new multimedia content in terms of interest are identified and selected.

The multimedia content is provided to one or more host vehicles for dissemination to target vehicles within the vehicle communication network. It should be understood that a potential host vehicle as selected by interest-target seeding or mobility-target seeding is initially identified based on a prior request by a vehicle to become a host vehicle. That is, vehicles within the vehicular communication network identify themselves to the authoritative entity as having in interest in becoming a host vehicle. Those vehicles that have identified themselves as having an interest in becoming a host vehicle are evaluated utilizing the preferred target seeding technique (i.e., mobility-target seeding or interest-target seeding) for selecting a host vehicle.

Figure 2:
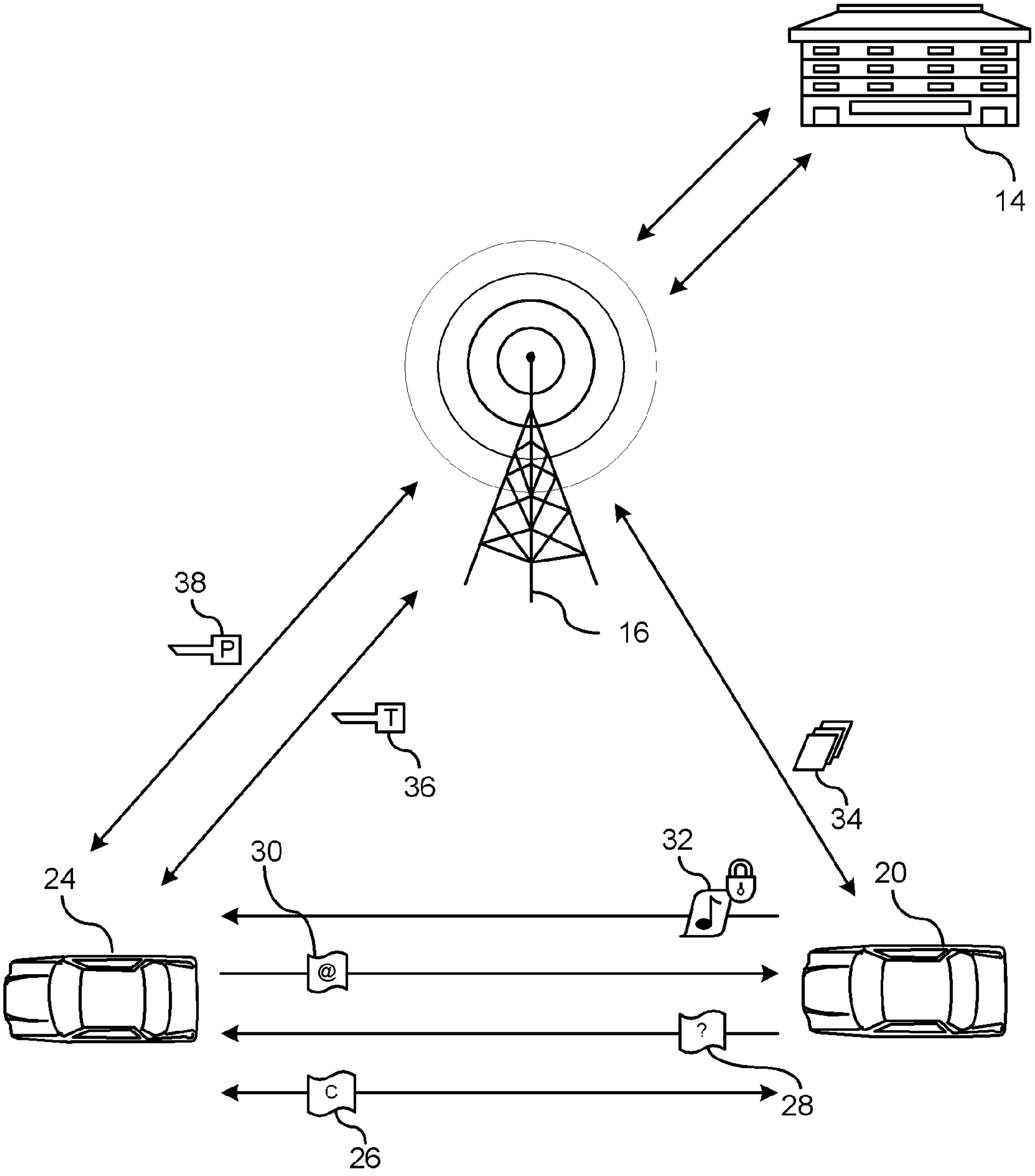
FIG. 2 is illustrates a multimedia content dissemination flow diagram according to the embodiment of the invention.

FIG. 2 illustrates a flow diagram of the communication between entities involved in disseminating the multimedia content. A host vehicle 20 is selected by the authoritative entity 14 for disseminating multimedia content. The multimedia content, which may include, but is not limited to, music, audio books, podcasts, videos, video clips, wallpaper, or software, is provided to the host vehicle 20 for dissemination. The multimedia content is provided in an encrypted format to prevent misuse and improper sharing of the multimedia content.

The host vehicle 20 encounters vehicle 24 traveling along the road. In the typical course of vehicle communication, each vehicle transmits a beacon message which includes a consumption content profile 26. The host vehicle 20 receives the consumption content profile 26 of the vehicle 24 and determines whether the vehicle 24 should be targeted for solicitation based on the consumption content profile 26. If the consumption content profile 26 indicates that the target vehicle 24 may have a potential interest in the multimedia content, then the host vehicle 20 transmits an inquiry 28 to the target vehicle 24. The inquiry includes a content profile of the multimedia content that contains descriptors associated with the multimedia content for allowing the target vehicle 24 to compare and determine whether there is any interest in going forward and evaluating the multimedia content. The descriptors provide general descriptions as to how the multimedia content would be classified. For example, if the multimedia content is music, the descriptors may include, but is not limited to, identifiers indicating that the multimedia content is music, identifiers indicating a genre of the music, and identifiers indicating an era or year of release of the music.

The target vehicle 24 compares the descriptors in the content profile of the multimedia content to its own consumption content profile 26. The target vehicle 24 will determine whether it has an interest in the multimedia content based on a predetermined number of descriptors in the profile content matching the criteria of the consumption content profile 26. Alternatively, the vehicle 24 may require that all of the descriptors in the content profile of the multimedia content must match the consumption content profile 26.

If the determination is made by vehicle 24 that an interest exists in the multimedia content, the target vehicle 24 sends a response 30 to the host vehicle 20 requesting a sampling of the multimedia content. The host vehicle 20 provides the encrypted multimedia content 32 to the target vehicle 24 in response to receiving the request 30. The host vehicle 20 also provides notification 34 to the authoritative entity 14 that the target vehicle 24 has received the encrypted multimedia content 32. The authoritative entity 14 will maintain a log of the transaction between the host vehicle 20 and the target vehicle 24 receiving the encrypted multimedia content 32.

The target vehicle 24 obtains a temporary decryption key 36 from the authoritative entity 14 for sampling the encrypted multimedia content 32. The authoritative entity 14 may contact the target vehicle 24 to establish communications and procedures for obtaining the temporary decryption key 36. Alternatively, the encrypted multimedia content 32 may have a program that automatically establishes a communication link with the authoritative entity 14 for obtaining the temporary decryption key 36 when the encrypted multimedia content 32 is initiated for playback by the target vehicle 24. The temporary decryption key 34 allows for a one-time playback sampling of the encrypted multimedia content 32 or some other form of sampling as set forth by the authoritative entity 14.

If the target vehicle 24 desires to obtain ongoing use of the encrypted multimedia content 32, then target vehicle 24 directly purchases a license of the multimedia content from the authoritative entity 14. The authoritative entity 14 issues a permanent decryption key 38 to the target vehicle 24 that allows ongoing use of the encrypted multimedia content 32 in response to purchasing the license. Thereafter, the target vehicle 24 can regularly use the multimedia content at their discretion.

The authoritative entity 14 logs the purchase of the multimedia content by the target vehicle 24 in its records. The host vehicle 20 is thereafter compensated for the purchase of the multimedia content based on its promotion and dissemination of the multimedia content to the target vehicle 24. Moreover, the authoritative entity 14 may provide compensation to the host vehicle 20 based on a number of samplings disseminated to various target vehicles within the vehicle communication network even though purchases were not made. This provides incentive to the host vehicles to continue ongoing promotion of the multimedia content within the communication network.

While certain embodiments of the present invention have been described in detail, those familiar with the art to which this invention relates will recognize various alternative designs and embodiments for practicing the invention as defined by the following claims.

What is claimed is:

1. A method for cooperatively disseminating multimedia content wirelessly among mobile vehicles in a wireless vehicle communication network, the communication between mobile vehicles within the wireless vehicle communication network utilize dedicated short-range communications, the method comprising the steps of:

selecting at least one host vehicle within the wireless vehicle communication network for disseminating multimedia content;

providing multimedia content to the at least one host vehicle by an entity authorized to distribute the multimedia content;

the at least one host vehicle selectively transmitting an inquiry to target vehicles in the wireless vehicle communication network, the inquiry comprising a content profile that includes descriptors associated with the multimedia content for allowing target vehicles to determine whether an interest exists in the multimedia content;

an interested target vehicle transmitting a response to the at least one host vehicle requesting a sampling of the multimedia content;

the at least one host vehicle transmitting the multimedia content in encrypted form to the interested vehicle for sampling the multimedia content;

the interested vehicle requesting ongoing use of the multimedia content from the authorized entity in response to sampling the multimedia content; and the authorized entity providing to the interested target vehicle a decryption key for authorizing ongoing use of the multimedia content.

2. The method of claim 1 wherein the at least one host vehicle is selected based on a mobility capability of the at least one host vehicle to contact an extensive portion of the wireless vehicle communication network.

3. The method of claim 1 wherein the at least one host vehicle is selected based on the at least one host vehicle having a specific interest in the multimedia content.

4. The method of claim 1 wherein each vehicle in the communication network includes a consumption content profile that identifies multimedia content interest based on each vehicle's prior multimedia content usage, and wherein a respective vehicle is targeted by the at least one host vehicle based on a relevance between the multimedia content and the consumption content profile.

5. The method of claim 4 wherein consumption content profile is transmitted between vehicles as part of a beacon message.

6. The method of claim 4 wherein a respective target vehicle receiving the inquiry compares its consumption content profile to the content profile of the multimedia content for determining whether an interest exists in the multimedia content.

7. The method of claim 6 wherein consumption content profile of the respective target vehicle matches each of the descriptors of the content profile of the multimedia content for establishing an interest.

8. The method of claim 6 wherein consumption content profile of the respective target vehicle matches a predetermined number of the descriptors of the content profile of the multimedia content for establishing an interest.

9. The method of claim 1 wherein the multimedia content provided to the interested vehicle for a sample playback is logged with the authorized entity.

10. The method of claim 1 wherein the interested vehicle requesting the ongoing usage of the multimedia content purchases the multimedia content from the authorized entity.

11. The method of claim 1 wherein the at least one vehicle disseminating the multimedia content to the interested target vehicle receives compensation by the authoritative entity for the purchase by the interested target vehicle.

12. The method of claim 1 wherein a temporary decryption key is obtained from authoritative entity for sampling the multimedia content.

13. The method of claim 12 wherein the temporary decryption key provides access to the multimedia content for a one-time sampling.

14. A multimedia content dissemination system for mobile vehicles, the system comprising:

a wireless vehicle communication network providing communication among the mobile vehicles of the network, the wireless vehicle communication network utilizing dedicated short term communications between the mobile vehicles;

an authorized entity for initiating distribution of multimedia content;

at least one host vehicle within the wireless vehicle communication network selected by the authorized entity for disseminating multimedia content received by the authorized entity, the at least one host vehicle transmitting an inquiry to target vehicles in the wireless vehicle communication network, the inquiry comprising a content profile that includes descriptors associated with the multimedia content for allowing target vehicles to determine whether an interest exists in the multimedia content;

wherein the at least one host vehicle transmits the multimedia content in encrypted form to an interested target vehicle for sampling the multimedia content, wherein the interested target vehicle requests ongoing use of the multimedia content from the authorized entity in response to sampling the multimedia content, and wherein the authorized entity provides to the interested target vehicle a decryption key for authorizing ongoing use of the multimedia content.

15. The multimedia content dissemination system of claim 14 further comprising a tracking module for logging the dissemination of the multimedia content from the at least one host vehicles to the target vehicles.

16. The multimedia content dissemination system of claim 15 wherein the tracking module includes a log for tracking purchases of the multimedia content by the target vehicle.

17. The multimedia content dissemination system of claim 14 further comprising a temporary decryption key, wherein the temporary decryption key is provided from the authoritative entity to the target vehicle for sampling the encrypted multimedia content.

18. The multimedia content dissemination system of claim 14 further comprising a target-seeding module for selecting the at least one host vehicle.

19. The multimedia content dissemination system of claim 18 wherein the target-seeding module is a mobility-seeding module, and wherein the at least one host vehicle is selected based on a mobility capability to contact an extensive portion of the wireless vehicle communication network.

20. The multimedia content dissemination system of claim 18 wherein the target-seeding module is an interest-seeding module, and wherein the at least one host vehicle is selected based on a vehicle having a specific interest relating to the multimedia content.

* * * * *